Aug. 11, 1942.  W. S. WOLF  2,292,421
HOSE COUPLING METHOD OF AND MEANS FOR FORMING SAME
Filed Sept. 8, 1938  2 Sheets-Sheet 1
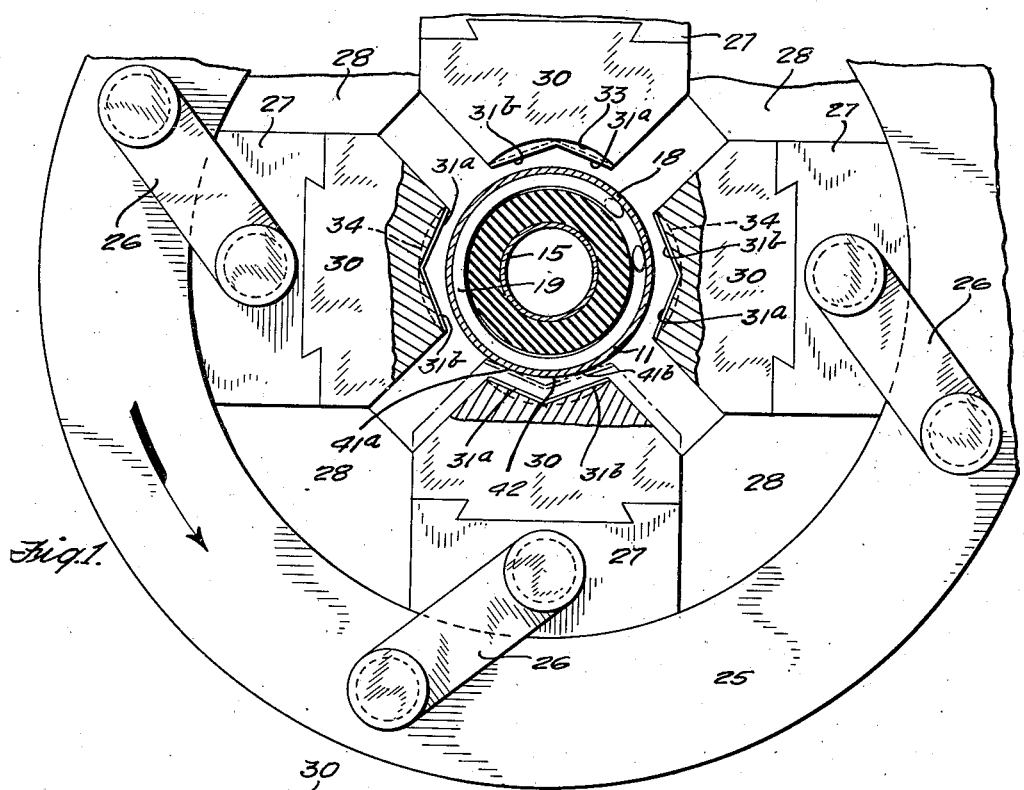
Fig. 1.
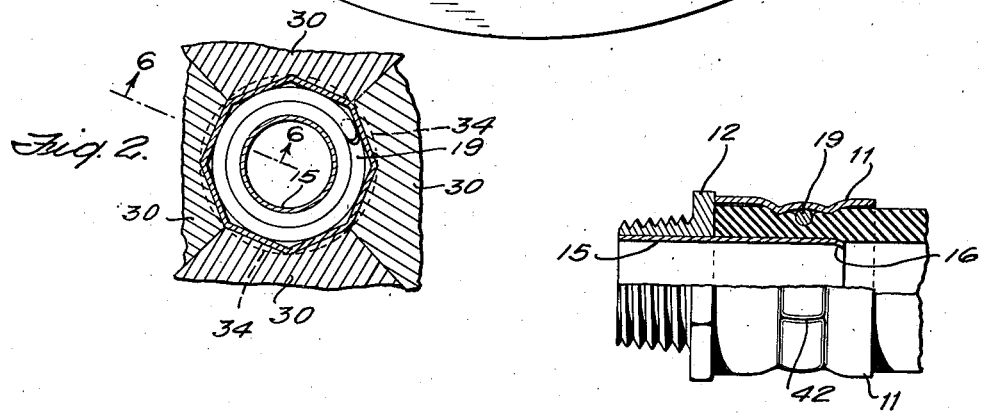
Fig. 2.
Fig. 4.
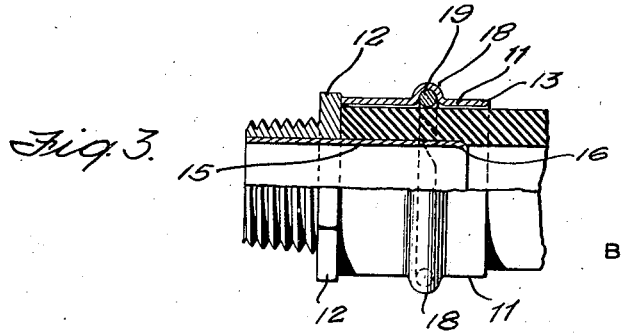
Fig. 3.
INVENTOR
W STEPHEN WOLF.
BY
Moses + Nolte
ATTORNEYS Aug. 11, 1942.   W. S. WOLF   2,292,421
HOSE COUPLING METHOD OF AND MEANS FOR FORMING SAME
Filed Sept. 8, 1938   2 Sheets-Sheet 2

INVENTOR
W STEPHEN WOLF.
BY
Moses + Nolte
ATTORNEYS

Patented Aug. 11, 1942

2,292,421

UNITED STATES PATENT OFFICE 2,292,421

HOSE COUPLING—METHOD OF AND MEANS FOR FORMING SAME

W. Stephen Wolf, New York, N. Y., assignor to United Metal Hose Company, Inc., Long Island City, N. Y., a corporation of New York Application September 8, 1938, Serial No. 228,902

1 Claim. (Cl. 29—88.2)

This invention relates to hose couplings and to methods and means for attaching coupling members to flexible hose.

The invention contemplates the use of a novel form of die for compressing the coupling member into locking engagement upon the end of the hose so as to securely fasten the hose to the coupling member without injury to the hose or coupling, providing a finished outside surface on the coupling member as attached, free from sharp edges or corners. A tight joint is secured serviceable for either low or high pressure use.

It is an object of this invention to provide an improved method of accomplishing this connection between the coupling member and the hose which shall have the advantages of simplicity of operation and superiority of the product obtained.

It is a further object of this invention to provide a hose coupling containing as its essential features a split ring which engages the hose in tight relation against a sleeve inserted into the hose, and an outer engaging sleeve about the outside of the hose and the split ring, engaging the split ring in polygonal relation.

It is a further object of this invention to provide a die polygonal in shape which accomplishes this formation of the outside of the hose coupling.

An additional object of the invention is to provide a hose coupling of the type described which is so formed by the die that the coupling proper has a longer useful life since it lacks points of weakness or breaks which may initiate deterioration or injure the hands of the user of the coupling.

Further objects and advantages will appear from the description and drawings wherein Fig. 1 is a fragmentary elevation partially in section of a die press carrying the improved dies, with the hose coupling member containing the hose before engagement shown therein in section taken through the recess for the split ring;

Fig. 2 is a fragmentary view similar to Fig. 1 showing the position of the dies after compression of the coupling into engagement with the hose and showing the shape of the compressed coupling;

Fig. 3 is a view partly in side elevation and partly in longitudinal section of the hose and coupling member before compression;

Fig. 4 is a view similar to Fig. 3 after compression;

Figure 5:
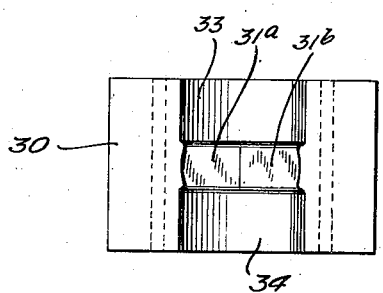
Fig. 5 is a view of the face of one of the dies shown in Fig. 1.

In Fig. 1 is diagrammatically shown a conventional die press or chuck for hose coupling work. Any suitable type of die press may be utilized, for instance, the well known form illustrated comprising a ring 25 which can be turned in the direction of the arrow and which has attached thereto a series of toggle links 26 pivotally attached to the sliding blocks 27 so that partial rotation of the ring 25 will result in the movement of the blocks 27 inwardly between the guides 28. Mounted in dove tail recesses in the blocks 27 are the die sections 30.

Figure 6:
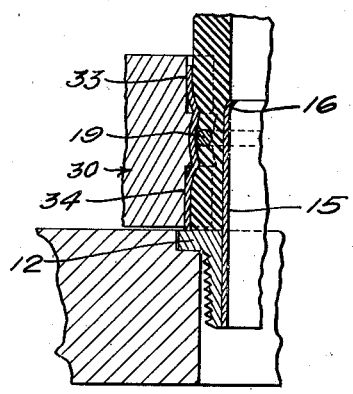
Fig. 6 is a section taken on the line 6—6 of Fig. 2.

The die in the example shown is octagonal and is divided into four sections 30, each of which comprises working faces 31a and 31b which form an angle of substantially 135° with each other so that when all four of the sections are in the position shown in Fig. 2 an octagonal shape is produced. A die section preferably comprises two spaced cylindrical faces 33 and 34 which have the approximate diameter of the circle circumscribing the octagonal portion of the die and have the octagonal portion located therebetween as shown in Figs. 5 and 6. The working faces of the die are preferably slightly curved in a direction longitudinal of the coupling as shown in Fig. 6, when intended for use with a coupling of the form shown. It will be understood that the form of the die faces may be varied to meet particular conditions of use and that polygonal forms other than octagonal may be utilized although the octagonal arrangement is the best for most purposes.

While the die and the method of this invention may be applied to the formation of couplings of various types I have found it particularly applicable to the type of coupling member described in a copending application of J. N. White, Serial No. 165,818, filed September 27, 1937, now Patent No. 2,250,286.

This coupling member comprises a sleeve 11, the inner diameter of which is preferably slightly in excess of the outside diameter of the hose, having a collar 12 at one end thereof and preferably a slightly outwardly flanged portion 13 at the other. The collar 12 extends inwardly until its inner diameter is substantially equal to the inner diameter of the hose to which the coupling member is to be applied. Within the collar 12 is located an inner sleeve 15 having an outside diameter approximately equal to or slightly less than the inside of the diameter of the hose. The inner surface of the sleeve 11 and the outer surface of the sleeve 15 are preferably relatively smooth and not formed with sharp threads or serrations, thus avoiding any injury to the hose by engagement of the sleeves therewith.

In the outer sleeve 11 of this type of coupling member is located a protuberance or annular rib 18. Within the protuberance is contained a split ring 19 which is preferably of metal and smooth surfaced. As illustrated, it may desirably be of substantially round cross section and may be beveled at its ends so that when depression of the split ring occurs and its circumference is reduced, the beveled ends will overlap each other forming a substantially complete circle.

As the die sections 30 move against the protuberance 18 an initial engagement occurs at the points 41a and 41b shown in Fig. 1 being intermediate points between the apexes of the octagon. As more pressure is applied and the shaping of the coupling and incidental depression of the split ring occurs, the excess metal of the protuberance 18 tends to be located at the point 42 and similar points about the die where the individual faces of the die meet in an angle as heretofore described, with the result that the coupling assumes the substantially octagonal shape shown in Fig. 2 and in the lower portion of Fig. 4. At the limit of movement of the die, the coupling member is engaged by the two cylindrical portions 33 and 34 of the die as well as the octagonal portion, thus preserving the true circular form of these portions of the coupling. It is, of course, clear that if other polygonal shape dies are used than octagonal the finished coupling will correspond to the die used.

Figure 7:
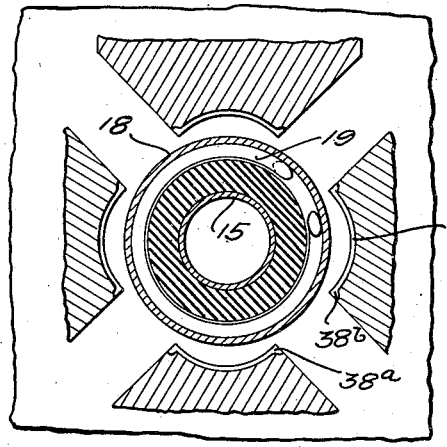
Figs. 7 and 8 are views similar to Figs. 1 and 2 showing the type of dies heretofore used and found objectionable.
Figure 8:
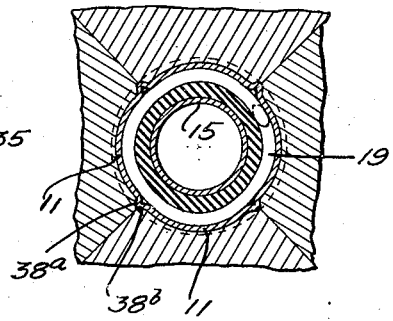

The advantages to be obtained by this type of die may be more clearly understood with reference to the dies heretofore used for compression of the coupling member described and of similar coupling members. Figs. 7 and 8 illustrate the action of a die of substantially round shape previously used in the art upon the coupling members described herein. The sections of the die 35 comprise conventional sectors of a circle. When a die of this type is used the initial engagement of the die sectors with the coupling member occurs at the points 38a and 38b, that is the edges of the quarter section of the die. As these sections move in against the coupling member a creasing occurs at the points 38a and 38b as is more clearly shown in Fig. 8 wherein the die sections are fully closed.

These creasings, of course, give rise to numerous disadvantages in the finished coupling in that the creasing is a point of considerable weakness and furnishes a place for corrosion to begin. Furthermore in many cases the crease formed at this point will be so sharp on the outside of the coupling member as to endanger the user.

The coupling of the present invention having been treated in the die shown in Fig. 1 has a complete absence of sharp creases or points of weakness which would give rise to the disadvantages above outlined. The excess material in the outside of the coupling member which results from the reduction in circumference of this portion of the coupling member is evenly distributed about the coupling member and the outside surface of the same presents a smooth and unblemished surface while the split ring 19 is firmly imbedded in the hose in permanent binding relation about the inner sleeve 15.

While I have illustrated and described in detail certain preferred forms of my invention, it is to be understood that changes may be made therein and the invention embodied in other structures. I do not, therefore, desire to limit myself to the specific constructions illustrated, but intend to cover my invention broadly in whatever form its principle may be utilized.

I claim:

A method of securing a coupling to a hose, wherein the coupling is of the type that includes an inner cylindrical sleeve and an outer cylindrical sleeve between which the hose is adapted to be inserted to have its inner wall forced into fluid tight engagement with the inner sleeve, and wherein the outer cylindrical sleeve has an annular raised bead between its ends to substantially entirely house a split ring; that method of contracting the outer coupling sleeve to force the ring into the hose to create the fluid tight engagement aforesaid comprising, applying a force simultaneously around the outer sleeve of the coupling to force the same toward the hose, and during such operation substantially reducing the bead into the plane of the outer sleeve thereby closing and contracting the ring into the hose, said method including the steps of contracting portions of said bead a greater extent than other portions until the reduced bead is changed from a cylindrical shape to a polygonal shape, whereby to relieve to some extent the flow of metal necessary to contract the ring to the degree desired.

W. STEPHEN WOLF.